United States Patent

[11] 3,601,409

[72] Inventor Ralph D. Marshall
San Francisco, Calif.
[21] Appl. No. 687,254
[22] Filed Dec. 1, 1967
[45] Patented Aug. 24, 1971
[73] Assignees Milton C. Johnson
San Francisco, ;
Wesley G. Schirman
San Rafael, Calif.

[54] HEAD ARRANGEMENT FOR STEREO TAPE PLAYERS
5 Claims, 3 Drawing Figs.

[52] U.S. Cl. 274/4 A
[51] Int. Cl. G11b 5/56, G11b 21/08
[50] Field of Search 274/4, 11; 179/100.2 C, 100.2 A, 100.2 M, 100.2 I, 100.2 Z

[56] References Cited
UNITED STATES PATENTS

| | | | |
|---|---|---|---|
| 2,551,845 | 5/1951 | Lindsay | 179/100.2 CA |
| 2,560,254 | 7/1951 | Schickel | 274/11 X |
| 2,908,769 | 10/1959 | Fonda | 274/11 X |
| 3,083,269 | 3/1963 | Gaubert | 274/11 X |
| 3,099,709 | 7/1963 | Barry | 274/11 X |
| 3,155,359 | 11/1964 | Hogan et al. | 274/4 HA |
| 3,369,081 | 2/1968 | Atsumi | 179/100.2 CA |
| 3,388,911 | 6/1968 | Wilson et al. | 274/4 |
| 3,154,308 | 10/1964 | Faulkner | 274/4 (A) |
| 3,420,965 | 1/1969 | Townsend et al. | 179/100.2 Z |
| 3,429,578 | 2/1969 | Furuichi | 274/4 (A) |
| 3,437,762 | 4/1969 | Lear et al. | 274/4 (A) |

FOREIGN PATENTS

| | | | |
|---|---|---|---|
| 856,472 | 12/1960 | Great Britain | 179/100.2 CA |

*Primary Examiner*—Harry N. Haroian
*Attorney*—Fryer, Tjensvold, Feix, Phillips & Lempio

ABSTRACT: A head arrangement for a stereo tape player comprises a vertically movable support plate having an erasing head and a recording and playback head mounted thereon. A stationary guide is arranged between the heads to maintain a four or eight track stereo tape in its proper position during movement past the heads.

PATENTED AUG 24 1971 3,601,409

INVENTOR.
RALPH D. MARSHALL
BY [signature]
ATTORNEY

HEAD ARRANGEMENT FOR STEREO TAPE PLAYERS

A conventional stereo tape player for automobiles or the like generally comprises a tape cartridge adapted to be positioned to have the endless tape thereof moved past a playback head. The player is programmed to reset the playback head automatically to engage a second pair of tape tracks after a first pair have been played. Such solid-state and fully transistorized players are limited to playing back the precise matter recorded on the tape and are not further adapted for selective erasing and recording purposes.

An object of this invention is to provide a compact and inexpensive erasing head and recording and playback head arrangement for stereo tape players wherein the heads are mounted on a common plate to substantially lie in the same horizontally disposed plane. Means is provided for permitting the plate to move vertically whereby selected pairs of stereo tape tracks may be engaged simultaneously by such heads. A tape guide is preferably arranged between the two heads to precisely position the tape during its run thereby.

The player incorporating this invention therein is adapted to be removed from an automobile, for example, and moved to a location wherein recorded matter on a tape may be erased selectively. The player is further adapted to expeditiously convert the playback head to a recording head whereby the erased portions of the tape may have music or the like transcribed thereon.

Other objects of this invention will become apparent from the following description and accompanying drawings, wherein.

Figures 1, 2:
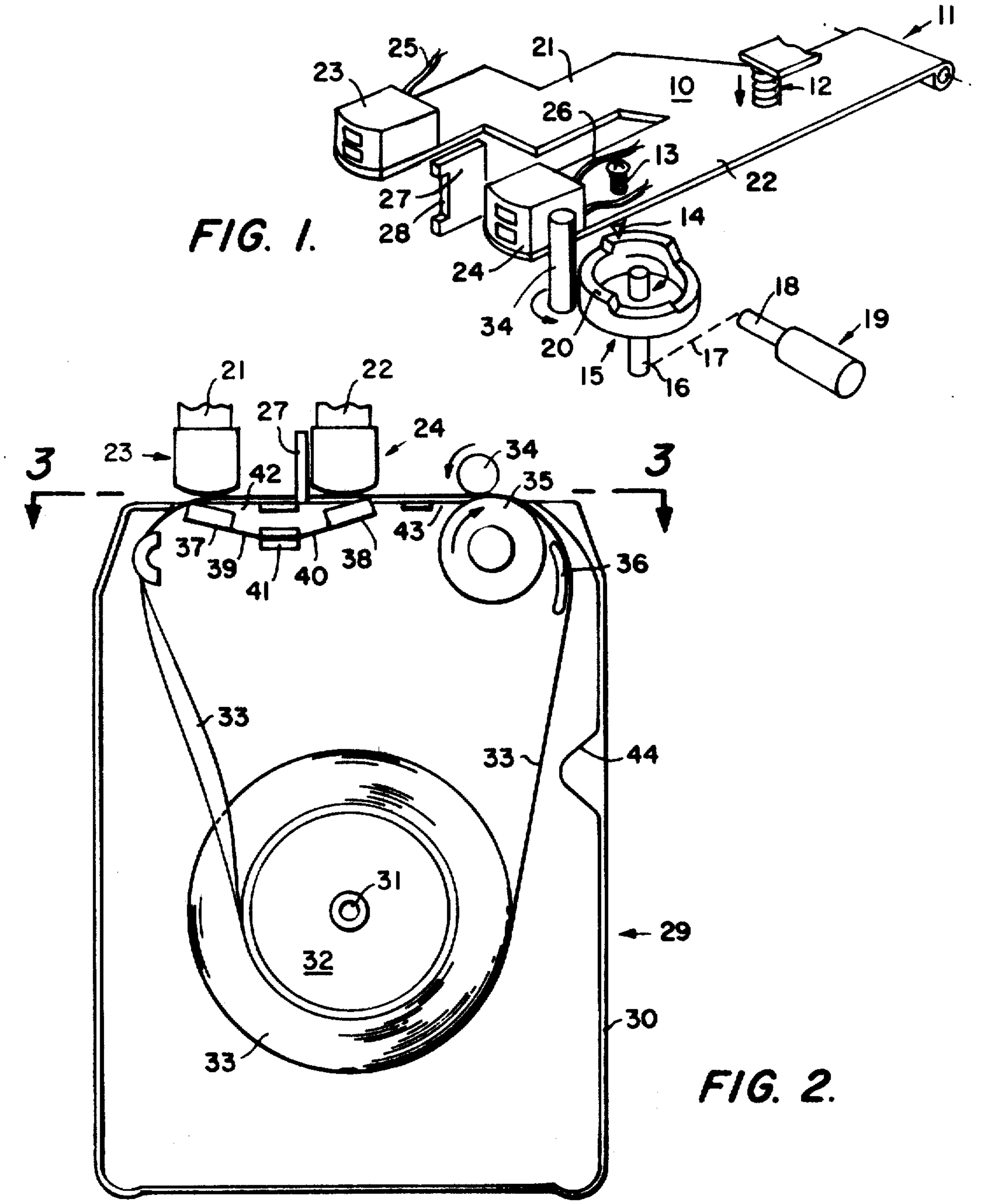
FIG. 1 is an isometric view schematically illustrating the erasing head and recording and playback head arrangement of this invention.
FIG. 2 is a top plan view of a portion of the head arrangement as it would appear in combination with a tape cartridge.

Referring to FIG. 1, the erasing head and recording and play head arrangement of this invention comprises a support plate 10 arranged for pivotal and substantial vertical movements on a pivot pin means 11. The pivot pin is operatively connected to the plate at the rearward end thereof. A spring means, schematically illustrated at 12, is preferably arranged to urge the plate downwardly in a counterclockwise direction about the pivot pin. An adjusting screw 13 is threadably mounted in the plate to have a tapered end 14 thereof selectively and sequentially engage four raised portions of a multifaced cam means 15.

The cam means is suitably mounted on a shaft 16 mechanically connected at 17 to a plunger 18 of a solenoid 19. The solenoid is operatively connected in the player's electrical circuit (not fully shown) and programmed in a conventional manner to rotate ratchet or cam 15 after the endless tape has completely played a pair of stereo tracks thereof. In particular, after such pair of tracks have been played, the solenoid will be actuated automatically by means, not shown, to rotate ratchet 15 approximately 90° to drop adjustment screw 14 onto the next lower cam face 20 under the influence of the spring means 12.

Plate 10 has first and second arms 21 and 22 suitably arranged to extend forwardly thereof to mount erasing head 23 and recording and playback head 24, respectively, on forward ends thereof. Electrical leads 25 and 26 are suitably connected to the player's electrical circuit in a conventional manner to transmit the picked up signals to their proper locations. The two heads are arranged to substantially lie in the same horizontally disposed plane whereby the same pair of stereo tracks will engage the two heads simultaneously.

A stationary tape guide means 27 has a notch 28 formed therein arranged between the two heads and in substantial alignment therewith. The guide means thus primarily functions to precisely guide the tape between the heads as more clearly illustrated in FIG. 2 to prevent undue vertical movements thereof. The guide means is preferably arranged at a distance from head 24 which is from 20 percent to 45 percent of the total distance between heads 23 and 24. Such an arrangement, placing the guide means closer to head 24 than to head 23, is preferred since tape "flutter" constitutes a greater problem at playback head 24 than at erasing head 23. In one actual application, the total distance between the foremost portions of the faces of the two heads constituted approximately 1¼ inches. In such application the distance between the foremost portion of the face of head 24 and guide means 27 approximated one-half of an inch.

A conventional cartridge 29 may be employed with the above-described head arrangement. The cartridge comprises a casing 30 arranged to have a stub shaft 31 thereof rotatably mount a spool 32. The spool has a conventional four or eight track stereo tape 33 rolled thereon in endless fashion. The tape is arranged to be moved past the heads by a drive roller 34. A backup idler roller 35 cooperates with the drive roller to slightly compress the tape therebetween for tape movement purposes.

Figure 3:
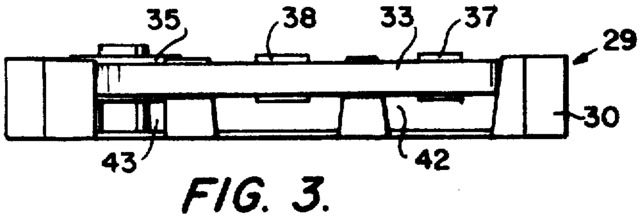
FIG. 3 is a front elevational view of the tape cartridge taken in the direction of arrows 3—3 in FIG. 2.

A stationary arcuate guide 36 may be arranged to aid in guiding movement of the tape back to the spool. Pads 37 and 38, mounted on resilient arms 39 and 40, respectively, aid in pressing the tape against the heads to afford adequate contact therebetween. The resilient arms may be mounted on a stationary member 41 suitably attached to casing 30. The casing further comprises upstanding lugs suitably arranged to form apertures 42 and 43 whereby the tape may be freely moved past the heads (FIG. 3).

In operation, cartridge 29 is inserted into the player and locked in position by engagement of a notch 44 with a lug (not shown) secured to the casing of the player. The unraveled forward-most portion of the tape thus engages heads 23 and 24 under the influence of pads 37 and 38. Guide means 27 assures precise positioning of the tape against the heads during tape movement.

Assuming that the endless tape has been transcribed as desired, the tape will continue to repeat itself due to the above-described arrangement of stepping cam 15. For example, after the four pairs of tracks of an eight track stereo tape have been played, the cam will be rotated automatically to its FIG. 1 position to return plate 10 to its uppermost, vertical position.

The player may be removed from an automobile, for example, and placed beside a home stereo set to employ erasing head 23 and recording head for selective transcribing purposes. The controls for selectively changing head 24 from one which plays back to one which records are well known in the art and do not form a part of this invention, per se. Likewise, the control means for selectively energizing head 23 for erasing purposes is well known in the art.

I claim:

1. An erasing and recording head arrangement in a cartridge-type stereo tape player comprising a plate having first and second arms arranged to extend forwardly thereof, horizontally disposed pivot pin means stationarily mounted in said player and operatively connected to said plate for permitting vertical movements of said plate and arms and for preventing vibration thereof, an erasing head means immovably attached to a forward end of said first arm, a recording and playback head means immovably attached to a forward end of said second arm, and tape guide means stationarily mounted in said player and arranged between and in substantial linear alignment with said erasing head means and said recording and playback head means for limiting vertical and lateral movements of a stereo tape and to aid in maintaining proper tape tension, said erasing head means and said recording and playback head means substantially arranged to lie in the same horizontally disposed plane whereby a stereo tape may engage said erasing head means and said recording and playback head means simultaneously.

2. The invention of claim 1 wherein said guide means is arranged at a distance from said recording and playback head means which is from 20 percent to 45 percent of the total distance between said erasing head means and said recording and playback head means.

3. The invention of claim 1 wherein said tape guide means comprises means forming a notch therein, said notch arranged in substantial alignment with said erasing and recording and playback head means.

4. The invention of claim 1 further comprising a stereo tape cartridge arranged adjacent to said two head means and further arranged to substantially lie in said horizontally disposed plane, said cartridge comprising a spool rotatably mounted in said cartridge and an endless stereo tape having at least one pair of tracks formed thereon, said stereo tape arranged to engage said two head means simultaneously.

5. The invention of claim 1 further comprising a multifaced cam means mounted for rotation vertically below said plate, screw means adjustably mounted in said plate and arranged to engage said cam means for selectively positioning said plate vertically upon rotation of said cam means and spring means stationarily mounted in said player and operatively connected to said plate to urge said screw means into engagement with said cam means.